United States Patent [19]

Guthrie

[11] 4,355,347

[45] Oct. 19, 1982

[54] TEMPERATURE CONTROL DEVICE

[76] Inventor: Rachael M. Guthrie, 503 Raccoon Trail, Chattanooga, Tenn. 37419

[21] Appl. No.: 38,281

[22] Filed: Jul. 11, 1980

[51] Int. Cl.³ .......................................... G01D 11/28
[52] U.S. Cl. .................................. 362/30; 362/29; 362/253; 362/280; 362/321
[58] Field of Search ................... 362/29, 30, 253, 280, 362/321

[56] References Cited

U.S. PATENT DOCUMENTS

| 2,286,737 | 6/1942 | Hills | 362/30 X |
| 3,254,534 | 6/1966 | Graham | 362/29 X |

*Primary Examiner*—Stephen J. Lechert, Jr.
*Attorney, Agent, or Firm*—Lamont Johnston

[57] ABSTRACT

A temperature control device is provided which comprises a thermostatic control means. The thermostatic control means is for automatically controlling the temperature of a location to a predetermined temperature. A means is additionally provided for setting the predetermined temperature. The means for setting includes an elongated temperature scale and a set point. The scale and set point are movable with respect to each other. The set point indicates the predetermined temperature on the scale.

The scale has associated therewith different colors along the periphery thereof. A means for illuminating the temperature scale near the set point is provided to reveal the color associated with the predetermined temperature. Thus an observer of the temperature control device, knowing the colors associated with the temperatures or knowing the colors at which he is most comfortable, can immediately observe from a distance the predetermined temperature at which the device is set. The device is particularly useful for those with impaired vision who cannot readily observe the numbers on the temperature scale.

1 Claim, 2 Drawing Figures

TEMPERATURE CONTROL DEVICE

BACKGROUND OF THE INVENTION

1. Field of the Invention

This invention relates generally to control devices, and more particularly to a temperature control device having illuminating means for determining the temperature at which the device is set.

2. Prior Art

It has been found that prior art temperature control devices are difficult to read and adjust. For instance, in the residential heating field control devices, which are usually temperature responsive, are often located in areas which are poorly lighted making it difficult for a person to determine the temperature at which the control device is set, and also to effect the desired setting.

Thermostatic control devices are well known in the art particularly those used to control the temperature of a residential unit. Both U.S. Pat. 3,251,549 to Hewitt, Jr. et al and U.S. Pat. No. 4,171,769 to Trimpey have thermostatically controlled temperature control devices which have an illuminating means associated therewith. Hewitt, Jr. et al provides a means for illuminating the complete dial; and Trimpey provides a light which is used as a night light apparatus and which also controls the heating system.

Color codes have been used in some electrical devices for example, U.S. Pat. No. 2,514,745 to Dalzell describes a color coded changeable scale electrical testing instrument; U.S. Pat. No. 2,582,024 to Finleyson describes a color coded heat setting and temperature indication device for use on a flatiron; U.S. Pat. No. 4,169,357 to Kelley describes a color coded device for use on a refrigerator and freezer monitoring device; and U.S. Pat. No. 3,621,811 to Hill, Jr. describes a color coded indicating condition controller.

None of the foregoing devices teach or suggest the invention described and claimed herein nor do they permit one to observe easily the temperature to which a temperature control device has been set, i.e. the predetermined temperature, from a distance by the mere observation of the color which is lit up on the temperature scale.

SUMMARY AND OBJECTS OF THE INVENTION

It is an object of this invention to provide a temperature control device which may be readily observed from across the room to determine the temperature at which the device is set.

It is a further object of this invention to provide a temperature control device having an illuminated temperature scale which is color coded so that one can immediately determine the temperature to which the device is set by observing the color which is lighted on the scale.

The present invention is directed to a temperature control device comprising:

a thermostatic control means for automatically controlling the temperature of a location to a predetermined temperature;

a means for setting a predetermined temperature, said means including an elongated temperature scale and a set point movable with respect to each other, the set point indicating the predetermined temperature on the scale, the scale having different colors along the periphery thereof, and a means for illuminating the temperature scale near the set point to reveal the color associated with the predetermined temperature.

BRIEF DESCRIPTION OF THE DRAWINGS

Although the characteristic features of this invention will be particularly pointed out in the claims, the invention itself, and the manner in which it is made and used may be better understood by referring to the following description taken in connection with the accompanying drawings forming a part hereof, wherein like reference numerals refer to like parts throughout the several views and in which:

DETAILED DESCRIPTION OF THE INVENTION

Figure 2:
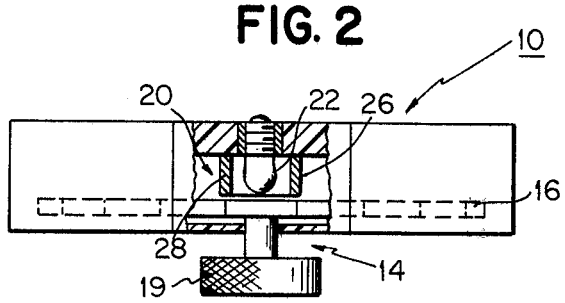
FIG. 2 is a top view, partly broken away, of the temperature control device depicted in FIG. 1.
Figure 1:
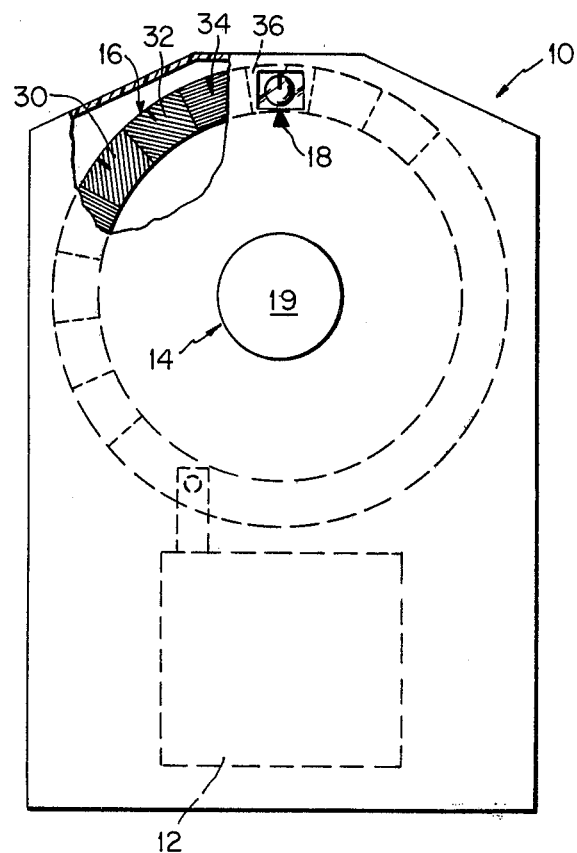
FIG. 1 is a front elevational view, partly broken away, showing an embodiment of the temperature control device of this invention.

Referring to FIGS. 1 and 2, there is shown a temperature control device, generally designated (10). The device is comprised of a thermostatic control means, generally designated (12). The thermostatic control means (12) is of the conventional type which automatically controls the temperature of a location to a predetermined temperature. Such thermostatic control means are well known in the art, as exemplified by the aforementioned Hewitt, Jr., et al., Hill Jr., and Trimpey, the entire disclosures of which are incorporated herein by reference.

Typically, as shown in Hewitt Jr., et al the control means has a dial for setting the predetermined temperature and also a temperature scale for indicating the temperature of the location, for example a residential unit.

In the invention described and claimed herein, referring to FIGS. 1 and 2, a means is provided, generally designated (14) for setting the predetermined temperature. This means generally includes an elongated temperature scale (16). As indicated in FIGS. 1 and 2 the elongated temperature scale (16) is in the form of a rotatable circular dial which is in the control device (10). A set point (18) is further provided. The set point (18) and the elongated temperature scale (16), e.g. the rotatable circular dial, are movable with respect to each other. As depicted in FIGS. 1 and 2, it is the elongated temperature scale (16) which is moved with respect to the set point (18) by turning a spindle (19). This invention also contemplates that the set point may be moved with respect to the elongated temperature scale to indicate the predetermined temperature on the scale. The elongated temperature scale (16) has thereon different colors (30, 32, 34 & 36) along the length of the scale (16). The colors can be of any hue, provided they are capable of indicating different temperatures along the temperature scale (16).

In a typical temperature control device for a residential unit, the temperature scale runs from about 50° F. to about 90° F. For example, the different colors along the length of the scale may run in continuous gradations of from, say light blue to dark red, respectively. Thus one viewing the temperature scale will immediately associate a color with a specific temperature and feeling, i.e. red would indicate hot temperature and light blue a cool temperature.

As shown in FIG. 1, another means of differentiating temperatures on scale (16) is to have associated with each increment of temperature (for example 2° F.) a different color. Thus the colors do not run in a continuum but are sharply delineated.

A means for illuminating (20) the temperature scale (16) if provided. Such illumination is provided near the set point (18) to reveal the color associated with the predetermined temperature.

Preferably the elongated temperature scale (16) is circular as indicated in FIGS. 1 and 2, and is translucent, thus the means for illuminating (20) the scale (16) can be a light source, e.g. a bulb (22) which is inside the temperature control device (10). The light rays from the bulb (22) thus pass through the temperature scale (16) to the outside of the temperature control device (10).

As depicted in FIGS. 1 and 2, a light shield means (26 & 28) is provided on both sides of the set point (18). The shield means (26 & 28) permit illumination of the temperature scale (16) near the set point (18) without illuminating the other portions of the temperature scale (16).

The temperature control device (10) of this invention may be utilized to control the temperature in any location, but is particularly applicable to residential units.

In use, one sets the predetermined temperature by moving the elongated temperature scale (16) until the predetermined temperature is indicated at set point (18). The bulb (22) lights up the area around the set point (18) and transmits to the observer a specific color for that specific predetermined temperature. Thus, one from a distance can easily determine what temperature the temperature control device is set for. This invention has particular application for people having impaired vision or in areas where the temperature control device is in a dark or secluded area.

While the form of the temperature control device described herein constitutes a preferred embodiment of the invention, it is to be understood that the invention is not limited to the precise form of device, and changes may be made therein without departing from the scope and spirit of the invention as defined in the appended claims.

I claim:
1. A temperature control device comprising:
   a thermostatic control means for automatically controlling the temperature of a location to a predetermined temperature;
   a stationary source of light shielded on both of its sides consisting of a set point, and a plurality of translucent temperature indicators through which the light shines which are mounted to be rotated manually to different settings of the control, each setting being indicated by a temperature indicator of a different shade of color, the shades of color ranging gradually from a light blue for a cool temperature to a dark red for a hot temperature.

* * * * *